US012003155B2

(12) United States Patent
Chiba et al.

(10) Patent No.: US 12,003,155 B2
(45) Date of Patent: Jun. 4, 2024

(54) OSCILLATORY ACTUATOR

(71) Applicant: FOSTER ELECTRIC COMPANY, LIMITED, Tokyo (JP)

(72) Inventors: Yusuke Chiba, Tokyo (JP); Yoshikazu Okazaki, Tokyo (JP)

(73) Assignee: FOSTER ELECTRIC COMPANY, LIMITED, Tokyo (JP)

(*) Notice: Subject to any disclaimer, the term of this patent is extended or adjusted under 35 U.S.C. 154(b) by 478 days.

(21) Appl. No.: 17/278,106

(22) PCT Filed: Sep. 17, 2019

(86) PCT No.: PCT/JP2019/036353
§ 371 (c)(1),
(2) Date: Mar. 19, 2021

(87) PCT Pub. No.: WO2020/059701
PCT Pub. Date: Mar. 26, 2020

(65) Prior Publication Data
US 2021/0351680 A1    Nov. 11, 2021

(30) Foreign Application Priority Data
Sep. 21, 2018    (JP) .................................. 2018-177950

(51) Int. Cl.
*H02K 33/02*    (2006.01)
*G06F 3/01*    (2006.01)
*H02K 1/34*    (2006.01)

(52) U.S. Cl.
CPC ............... *H02K 33/02* (2013.01); *H02K 1/34* (2013.01); *G06F 3/016* (2013.01)

(58) Field of Classification Search
CPC .......... H02K 33/02; H02K 1/34; H02K 33/16; H02K 5/225; H02K 35/00; H02K 33/00;
(Continued)

(56) References Cited

U.S. PATENT DOCUMENTS 5,596,442 A    1/1997    Plesko
8,573,569 B2 *    11/2013    Hasegawa .............. F16F 7/1011
                                                                           267/140.14
(Continued)

FOREIGN PATENT DOCUMENTS

EP          0909896 A2    4/1999
JP          S6145745        3/1986
(Continued)

OTHER PUBLICATIONS

Extended European Search Report for EP19862936.2; dated Oct. 11, 2021; European Patent Office; entire document.

*Primary Examiner* — Ahmed Elnakib
(74) *Attorney, Agent, or Firm* — Allen Dyer et al.

(57) ABSTRACT

An oscillatory actuator 1 includes a cylindrical case 2, an electromagnetic driver 3, a mover 4, a first damper 40a, and an inner guide 6a. The electromagnetic driver 3 is provided inside the case 2. The mover 4 is enabled to oscillate through driving by the electromagnetic driver 3. The first damper 40a has a plurality of arms 52a supporting the mover 4 from an inner surface of the case 2. The inner guide 6a is provided on the inner surface of the case 2 and restricts movement of the first damper 40a beyond a predetermined range. The inner guide 6a is located further toward a center of the case 2 than the first damper 40a in a direction of an oscillation axis ○ of the mover 4.

6 Claims, 7 Drawing Sheets

(58) Field of Classification Search
CPC ........ H02K 33/10; H02K 33/12; H02K 33/14; G06F 3/016; B06B 1/045; H01F 7/20
USPC ... 310/15, 17, 21, 23, 25, 26, 27, 28, 29, 30
See application file for complete search history.

(56) References Cited

U.S. PATENT DOCUMENTS

| | | | |
|---|---|---|---|
| 2002/0008602 A1* | 1/2002 | Kyouno | G10K 9/20 335/220 |
| 2015/0155767 A1 | 6/2015 | Odajima et al. | |
| 2016/0172950 A1 | 6/2016 | Shim et al. | |
| 2017/0141666 A1 | 5/2017 | Shim et al. | |
| 2017/0216665 A1 | 8/2017 | Takeda et al. | |
| 2017/0216885 A1 | 8/2017 | Takeda et al. | |
| 2019/0184425 A1 | 6/2019 | Takeda et al. | |
| 2021/0351680 A1* | 11/2021 | Chiba | H02K 33/02 |

FOREIGN PATENT DOCUMENTS

| | | | |
|---|---|---|---|
| JP | 2004195444 | | 7/2005 |
| JP | 201570730 | | 4/2015 |
| JP | 201630251 | | 3/2016 |
| JP | 2016538821 | | 12/2016 |
| KR | 20110083333 | * | 7/2011 |
| WO | 199939843 | | 8/1999 |
| WO | 2018030264 | | 2/2018 |

* cited by examiner

OSCILLATORY ACTUATOR

CROSS-REFERENCE TO RELATED APPLICATIONS

This application is the § 371 National Stage of International Application No. PCT/JP2019/036353, filed on Sep. 17, 2019, which claims the benefit of Japanese Patent Application Serial No. 2018-177950, filed on Sep. 21, 2018, the contents of which applications are herein incorporated by reference in their entirety.

FIELD OF THE INVENTION

The present disclosure relates to an oscillatory actuator.

BACKGROUND OF THE INVENTION

A conventional method for notifying a person of incoming calls and alarms in communication devices such as cell phones uses oscillation of an oscillatory actuator (or oscillatory motor). In recent years, in the fields of movies, games, and virtual reality (VR), for example, oscillatory actuators have been used as devices for producing dramatic effects in action scenes and feedbacks to players, improving reality by stimulating sense of touch in people through oscillation.

Many oscillatory actuators are to be incorporated into other devices for use as oscillation sources, and thus are desired to be small-sized because of an emphasis on space saving. An oscillatory actuator has a structure that electrically causes reciprocation of a mover containing a weight or the like. However, the mover can excessively oscillate due to an external impact. Specifically, for example, an impact such as dropping impact can cause interference between the mover and other components in the oscillatory actuator. This interference can cause, for example, deformation or damage in the components, which can result in an operation failure or abnormal noise. In the case of an oscillatory actuator that is used in a cell phone, a game controller, or the like, in particular, it is difficult to avoid impacts such as dropping impacts.

As one solution, oscillatory actuators that have been disclosed are provided with cushions for mitigating a shock due to a mover hitting an oscillatory actuator case (see Patent Documents 1 and 2). According to this technique, it is possible to mitigate a shock in the oscillation direction of the mover.

Patent Document 1: Japanese Unexamined Patent Application Publication No. 2015-70730

Patent Document 2: Japanese Unexamined Patent Application Publication (Published Japanese Translation of PCT Application) No. 2016-538821

Patent Document 3: Japanese Examined Utility Model Application Publication No. S61-45745

However, the cushions disclosed in Patent Documents 1 and 2 are located further outward than the mover in the oscillation direction of the mover. Specifically, the cushions are provided on the inside of either end face of the case. Such a configuration requires a space for the cushions to be provided inside the case, and thus results in an increase in the size of the oscillatory actuator.

In the oscillatory actuator disclosed in Patent Document 1, the mover is supported by a guide shaft. The movement of the mover is therefore restricted to the oscillation direction. By contrast, in the case of an oscillatory actuator having a structure in which a mover is supported by a plate spring (so-called butterfly damper) and is not provided with a guide shaft, such as disclosed in Patent Document 2 (see also Patent Document 3 for the use of a plate spring), an impact in the radial direction of the case can cause the mover to move in the radial direction to come in contact with the inside of the case. Providing a cushion on an inner surface of the case in the radial direction in an attempt to mitigate a shock however leads to a further increase in the size of the oscillatory actuator.

SUMMARY OF THE INVENTION

An embodiment of the present invention has been conceived in order to solve the above problems, and an object thereof is to provide an oscillatory actuator that achieves prevention or reduction of the following at the same time: an increase in the size of the oscillatory actuator, excessive amplitude of oscillation of a mover due to an external impact, and deformation or damage in components due to interference between the components.

In order to achieve the above-described object, an oscillatory actuator according to an embodiment of the present invention includes a cylindrical case, an electromagnetic driver, a mover, a plate spring, and an inner guide. The electromagnetic driver is provided inside the case. The mover is enabled to oscillate through driving by the electromagnetic driver. The plate spring has a plurality of arms supporting the mover inside the case. The inner guide is provided inside the case and restricts movement of the plate spring. The inner guide is located further toward a center of the case than the plate spring in a direction of an oscillation axis of the mover.

In the oscillatory actuator described above, the inner guide restricts the movement of the plate spring in the direction of the oscillation axis.

In the oscillatory actuator described above, the inner guide restricts the movement of the plate spring in directions intersecting the direction of the oscillation axis.

In the oscillatory actuator described above, the arms of the plate spring form a spiral shape, and the inner guide includes steps having a helical shape that is centered around the direction of the oscillation axis and that corresponds to the spiral shape of the plate spring.

In the oscillatory actuator described above, the inner guide is located between the electromagnetic driver and the plate spring in the direction of the oscillation axis of the mover.

In the oscillatory actuator described above, an inner edge of the inner guide is located further toward the mover than an inner surface of the electromagnetic driver.

In the oscillatory actuator described above, the plate spring includes a first plate spring supporting one end of the mover and a second plate spring supporting an opposite end of the mover, and the inner guide includes a first inner guide configured to restrict movement of the first plate spring and a second inner guide configured to restrict movement of the second plate spring.

An oscillatory actuator having the above-described configuration according to an embodiment of the present invention achieves prevention or reduction of the following at the same time: an increase in the size of the oscillatory actuator, excessive amplitude of oscillation of the mover and interference between the components due to an external impact, and deformation or damage in the components.

DETAILED DESCRIPTION OF PREFERRED EMBODIMENTS

The following describes an embodiment of the present invention with reference to the drawings.

Figure 1:
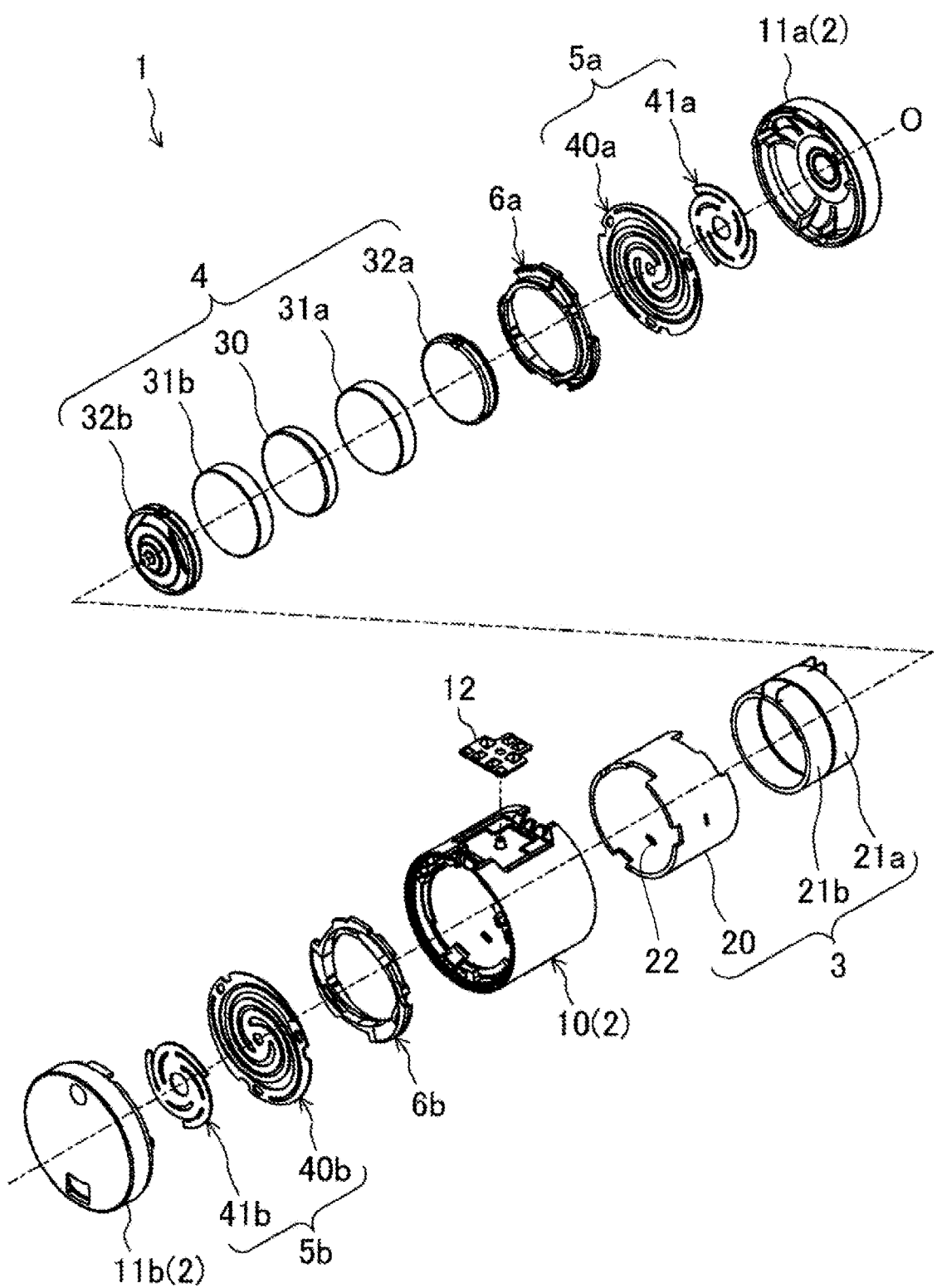
FIG. 1 is an exploded perspective view of an oscillatory actuator according to an embodiment of the present invention.
Figure 2A:
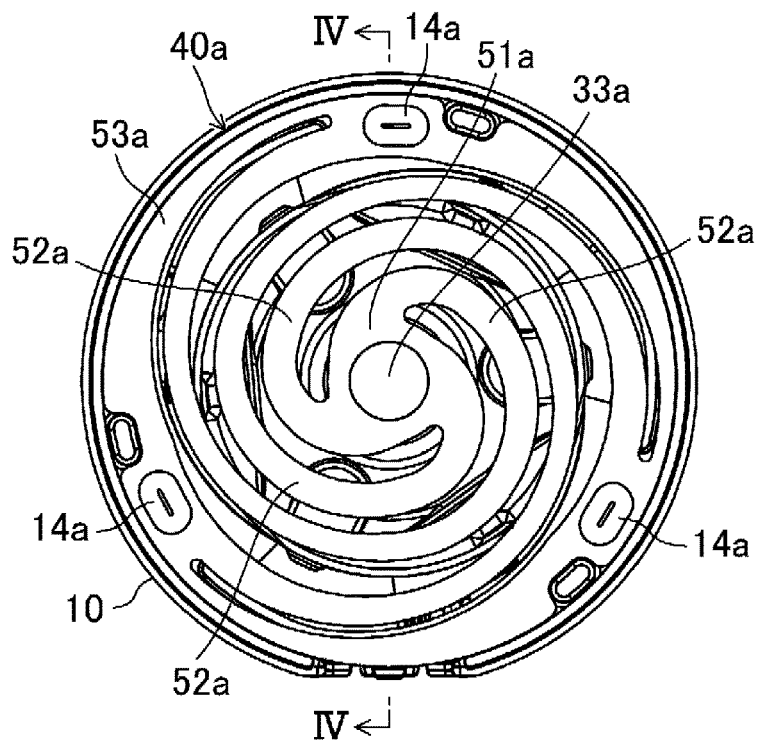
FIG. 2A is a top view of the oscillatory actuator in which a first cover case and a first elastic member are omitted.
Figure 2B:
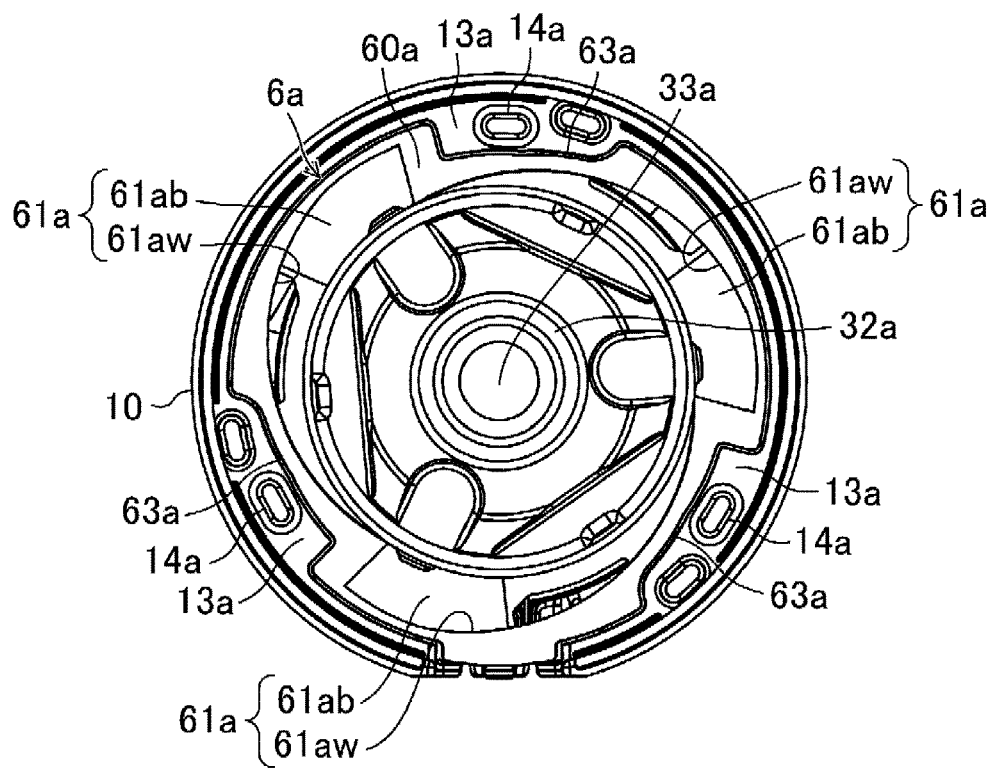
FIG. 2B is a top view of the oscillatory actuator in which the first cover case, the first elastic member, and a first damper are omitted.
Figure 3:
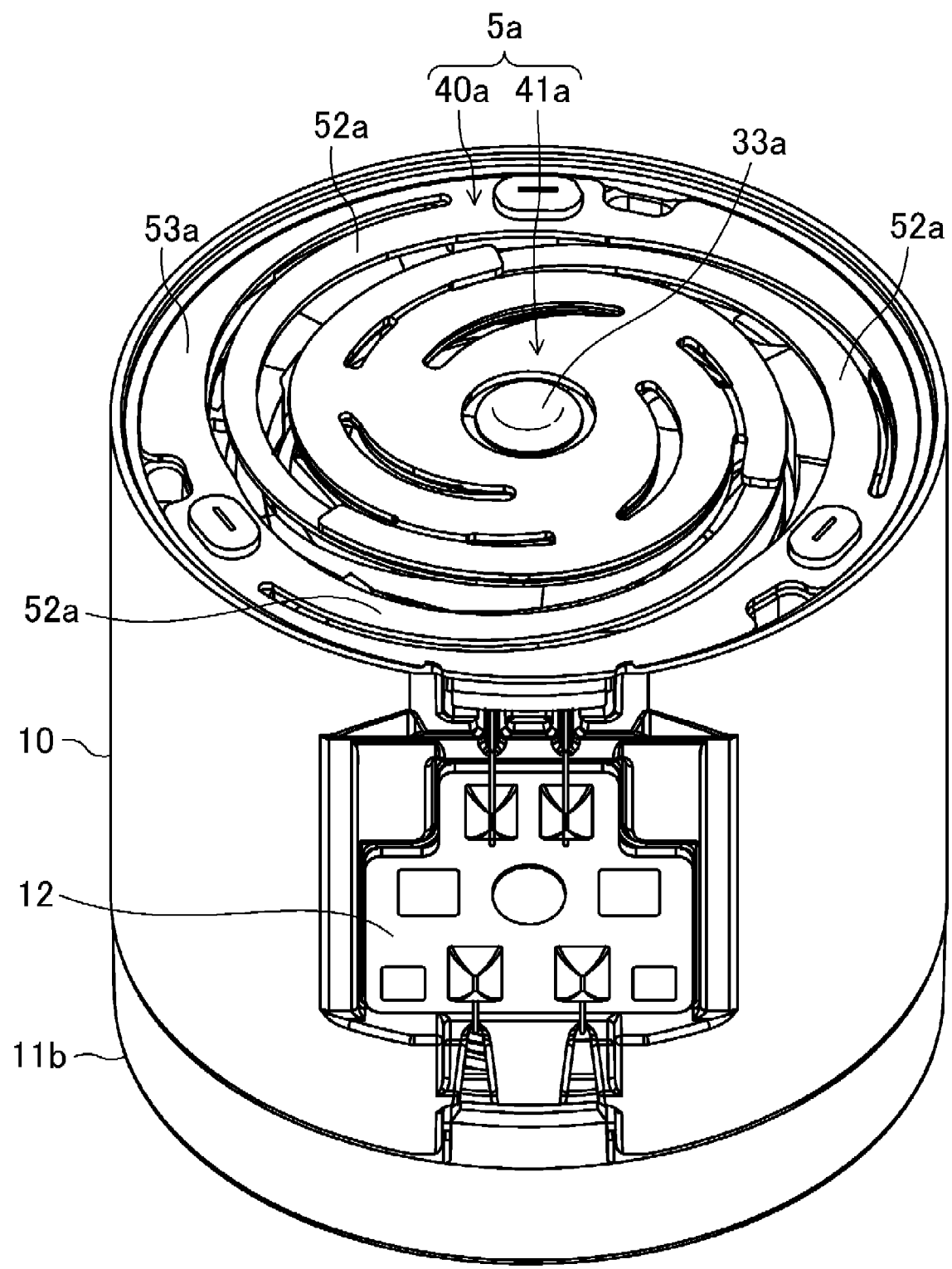
FIG. 3 is a perspective view of the oscillatory actuator according to the embodiment of the present invention in which the first cover case is omitted.
Figure 4:
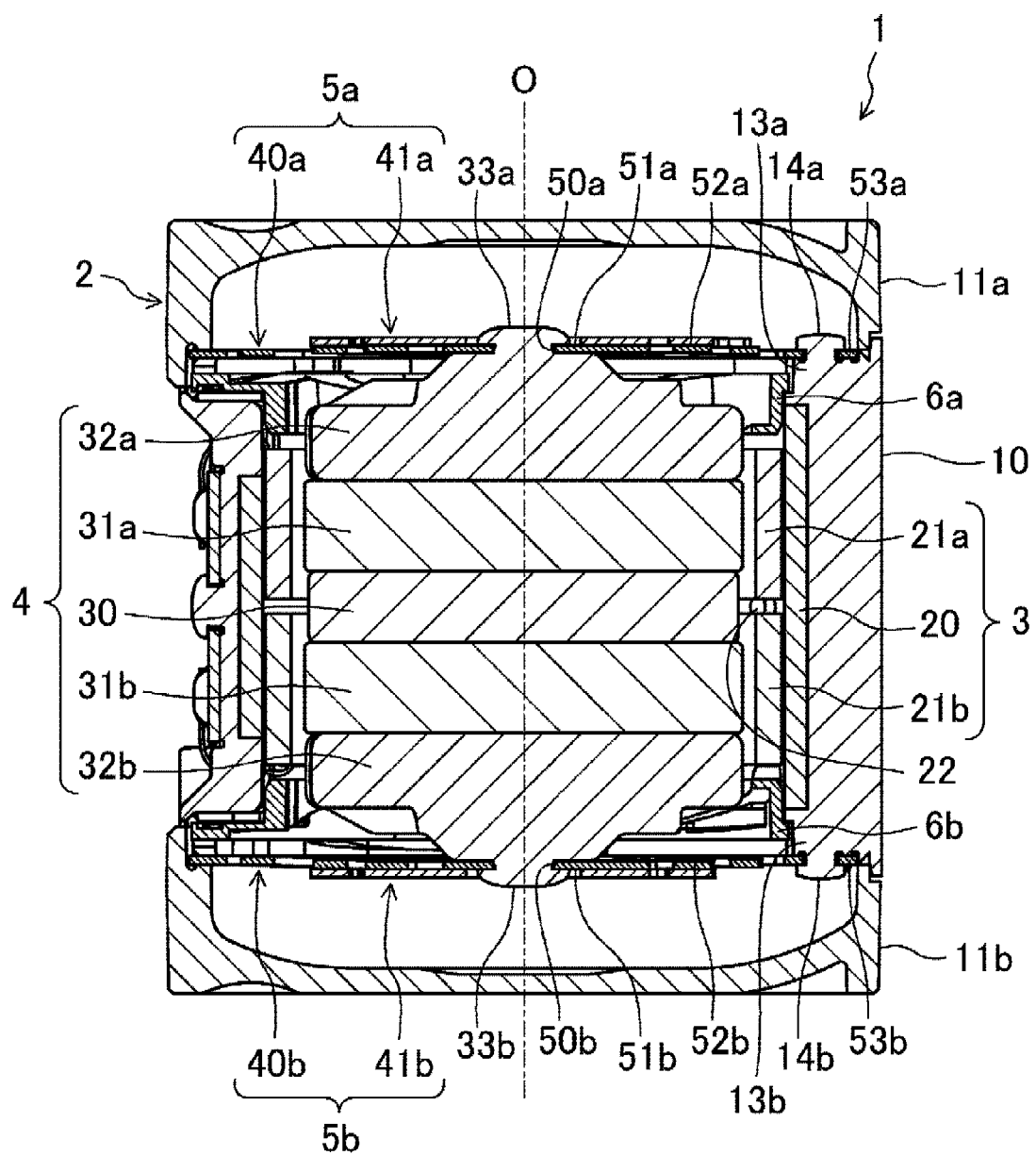
FIG. 4 is a cross-sectional view taken along line IV-IV in FIG. 2A.
Figure 5A:
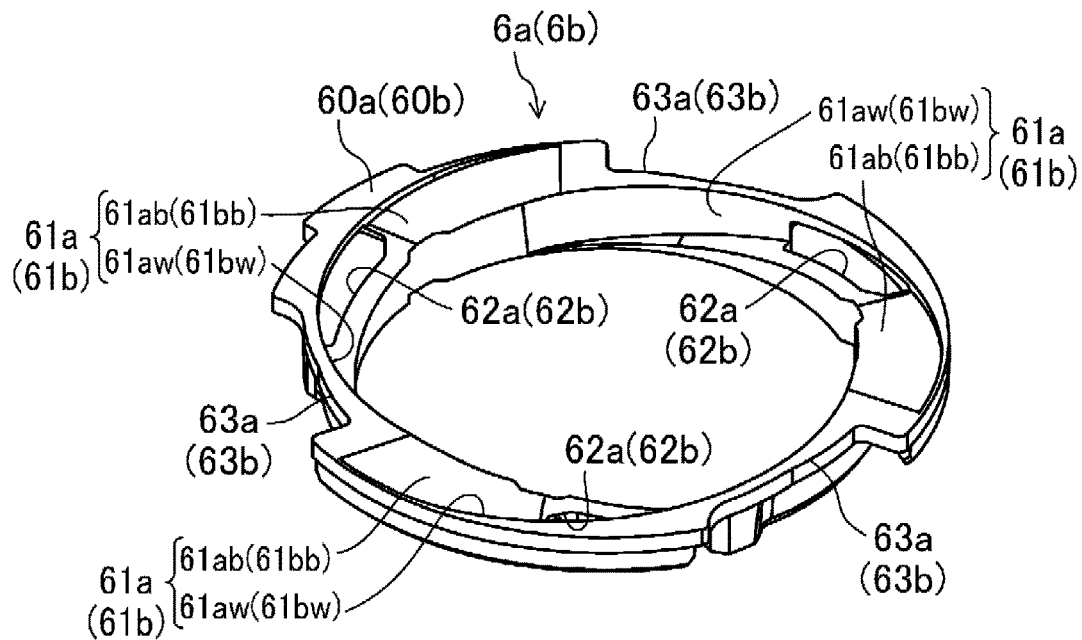
FIG. 5A is a perspective view of a first inner guide.
Figure 5B:
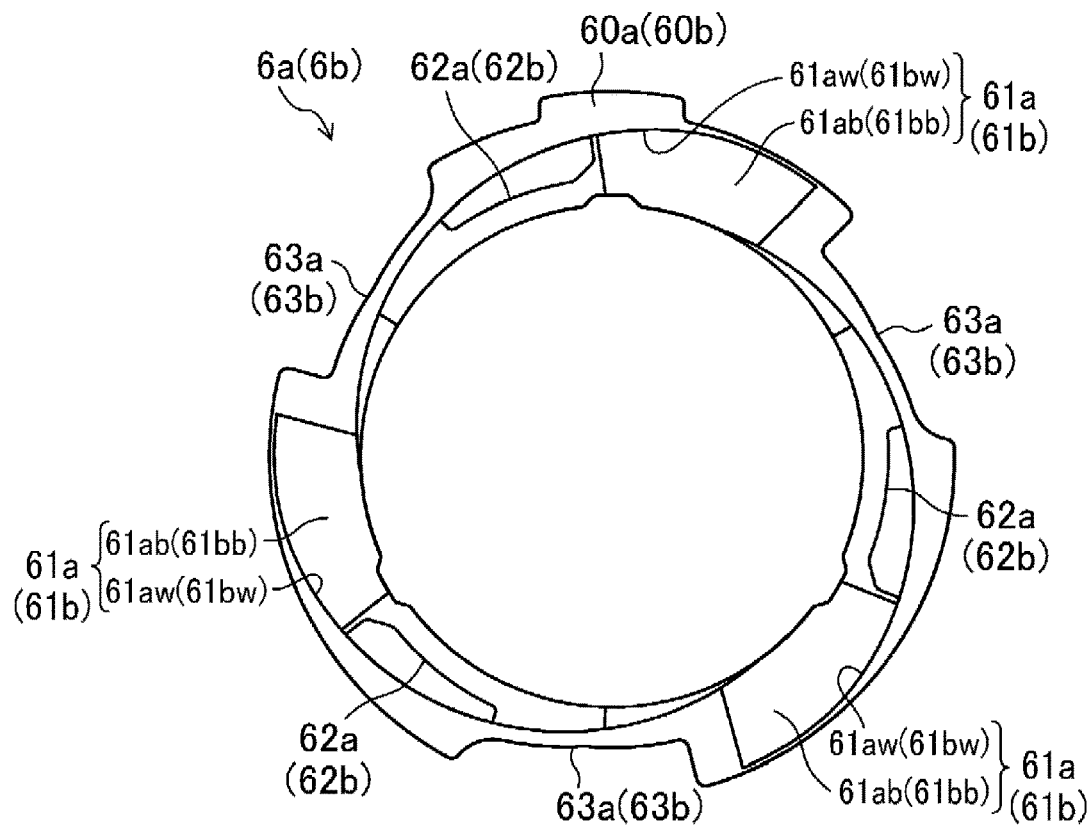
FIG. 5B is a top view of the first inner guide.

FIG. 1 is an exploded perspective view of an oscillatory actuator according to an embodiment of the present invention. FIG. 2A is a top view of the oscillatory actuator in which a first cover case and a first elastic member are omitted. FIG. 2B is a top view of the oscillatory actuator in which a first damper is further omitted. FIG. 3 is a perspective view of the oscillatory actuator. FIG. 4 is a cross-sectional view of the oscillatory actuator. FIG. 5A is a perspective view of an inner guide. FIG. 5B is a top view of the inner guide. Hereinafter, a configuration of the oscillatory actuator will be described based on the drawings.

An oscillatory actuator 1 mainly includes: a case 2 forming an outer shell; an electromagnetic driver 3 provided inside the case 2; a mover 4 enabled to oscillate through driving by the electromagnetic driver 3; a first support unit 5a and a second support unit 5b elastically supporting opposite ends, respectively, of the mover 4; and a first inner guide 6a and a second inner guide 6b configured to restrict movement of the first support unit 5a and the second support unit 5b. The oscillatory actuator 1 is, for example, mounted in a mobile terminal, such as a cell phone or a smart phone, or in a controller of a gaming console.

The case 2 includes a cylindrical case body 10 having opposite open ends closed by a first cover case 11a and a second cover case 11b. The case body 10, the first cover case 11a, and the second cover case 11b are each made from a resin such as ABS. A terminal 12 to which a lead wire, not shown, is connected is provided on an outer surface of the case body 10.

The electromagnetic driver 3 has a cylindrical yoke 20, a first coil 21a, and a second coil 21b. The yoke 20 is made from a soft magnetic material and disposed inside the case 2. The first coil 21a and the second coil 21b are attached to an inner surface of the yoke 20 and are electrically insulated from the yoke 20.

As illustrated in FIG. 4, the yoke 20 has projections 22 projecting inward in a radial direction in central positions in a direction of an oscillation axis O. The projections 22 are provided at three locations equally spaced at a 120° pitch around the oscillation axis O and project from the inner surface of the yoke 20. The projections 22 are formed by dowel processing, for example.

The first coil 21a and the second coil 21b are wound along the inner surface of the yoke 20. Each of the first coil 21a and the second coil 21b is capable of generating a magnetic field through energization by the terminal 12. The first coil 21a and the second coil 21b are attached to the yoke 20 using, for example, an adhesive. The first coil 21a and the second coil 21b are positioned with respect to the direction of the oscillation axis O and are in contact with the projections 22 of the yoke 20.

The mover 4 is surrounded by the first coil 21a and the second coil 21b, and oscillates along the oscillation axis O. The mover 4 includes: a disc-shaped magnet 30; a disc-shaped first pole piece 31a and a disc-shaped second pole piece 31b stacked with the magnet 30 therebetween; and a first mass (weight) 32a and a second mass (weight) 32b stacked with the magnet 30, the first pole piece 31a, and the second pole piece 31b therebetween.

The magnet 30 is magnetized in the direction of the oscillation axis O. The first pole piece 31a and the second pole piece 31b are made from a soft magnetic material, and are attached to the magnet 30 through, for example, magnetic attraction force of the magnet 30 and an adhesive. The first mass 32a and the second mass 32b are made from a non-magnetic material, and are respectively attached to the first pole piece 31a and the second pole piece 31b through, for example, an adhesive. Thus, the magnet 30, the first pole piece 31a, the second pole piece 31b, the first mass 32a, and the second mass 32b that form the mover 4 are integrated. Note that the integration of the magnet 30, the first pole piece 31a, the second pole piece 31b, the first mass 32a, and the second mass 32b is not limited to being achieved by the above-described attachment through magnetic attraction force or adhesives. The integration may alternatively be achieved through fixation using mechanical or other methods such as screwing. The first mass 32a and the second mass 32b respectively have flat contact surfaces in contact with the first pole piece 31a and the second pole piece 31b. However, surfaces opposite to the respective contact surfaces have a helical shape whose center axis coincides with the oscillation axis O, and tips 33a and 33b on the center axis are outermost portions.

Opposite ends of the mover 4 having the above-described configuration in the direction of the oscillation axis O, which in other words are the tip 33a of the first mass 32a and the tip 33b of the second mass 32b, are respectively supported by the first support unit 5a and the second support unit 5b.

The first support unit 5a includes a first damper 40a (first plate spring) and a first elastic member 41a provided over one surface of the first damper 40a.

As illustrated in FIG. 2A, a central portion of the first damper 40a includes a support 51a having a hole 50a (shown in FIG. 4). The first damper 40a is coupled to the mover 4 through the hole 50a. Specifically, the first damper 40a and the mover 4 are crimped together through the tip 33a of the first mass 32a being inserted into the hole 50a and beaten out. Note that the first damper 40a and the mover 4 are not limited to being fastened to each other through crimping, and may alternatively be fastened (coupled) to each other by other methods such as screwing or bonding.

The first damper 40a has three arms 52a spirally extending from the support 51a to the outer circumference. The arms 52a are equally spaced at a 120° pitch around the oscillation axis O. An outer periphery end of each arm 52a is coupled to an annular frame 53a along an inner surface of the case body 10. The frame 53a is coupled to flanges 13a (shown in FIG. 2B) that are provided at three locations at a 120° pitch around the oscillation axis O on the inner surface of the case body 10 and that protrude inward in the radial direction. Specifically, the frame 53a and the flanges 13a are crimped together through boss portions 14a, which are raised from the flanges 13a, being inserted into through-holes formed in the frame 53a of the first damper 40a, and tips of the boss portions 14a being heated, pressurized, and beaten out. The frame 53a and the first damper 40a are not limited to being fastened through crimping, and may alternatively be fastened (coupled) by other methods such as screwing or bonding.

The first damper 40a is formed of one or more metal plate springs. For example, in the present embodiment, a processed thin stainless steel (spring material) plate is used. The material of the first damper 40a is not limited to a metal, and may be a composite material containing a resin or fiber. Materials resistant to fatigue and excellent in flexibility are desirable.

The first damper 40a having the above-described configuration is elastically deformable within a predetermined range in the direction of the oscillation axis O and in intersecting directions perpendicular to the oscillation axis O including the radial direction. Note that this predetermined range corresponds to an oscillation range of the mover 4 in normal use of the oscillatory actuator 1. The predetermined range is therefore at least a range that keeps the first damper 40a from coming in contact with the case 2 and that does not exceed the elastic deformation limit of the first damper 40a.

As illustrated in FIG. 3, the first elastic member 41a has a plate shape whose outline fits a shape of an area from the support 51a of the first damper 40a to certain locations on the arms 52a. The first elastic member 41a is fixed to the one surface of the first damper 40a. Specifically, the first elastic member 41a includes a first adhesive layer made from an adhesive, a PE layer made from polyethylene (PE), a second adhesive layer made from an adhesive, and an elastomer layer made from an elastomer (examples of elastomers include, but not limited to, thermoplastic polyurethane elastomer (TPU)) that are stacked on the first damper 40a. The elastic deformation of the first elastic member 41a (shear deformation of the PE layer and bending deformation of the elastomer layer in the present embodiment) damps oscillation of the first damper 40a. The first elastic member 41a and the first damper 40a are not limited to being fixed to each other through the bonding described above, and may be fixed to each other by other methods such as thermal welding of the first elastic member 41a made from a resin to the first damper 40a.

The second support unit 5b has the same configuration as the first support unit 5a. That is, the second support unit 5b includes a second damper 40b (second plate spring) and a second elastic member 41b. Note that the second damper 40b and the first damper 40a in the present embodiment have the same shape and are made from the same material. Likewise, the second elastic member 41b and the first elastic member 41a have the same shape and are made from the same material. As illustrated in FIG. 4, three arms 52b of the second damper 40b extend from a support 51b having a hole 50b to an annular frame 53b. The second damper 40b is coupled to the mover 4 by crimping through the tip 33b of the second mass 32b being inserted into the hole 50b and beaten out. The annular frame 53b of the second damper 40b is coupled to three flanges 13b protruding from the inner surface of the case body 10 by crimping through boss portions 14b of the flanges 13b being inserted into through-holes formed in the frame 53b and beaten out. Note that the spiral direction of the arms 52b of the second damper 40b is opposite to the spiral direction of the arms 52a of the first damper 40a. As a result, the mover 4 receives torque in opposite directions from the first damper 40a and the second damper 40b, respectively, during oscillation. The mover 4 is therefore allowed to shift in the direction of the oscillation axis O but kept from rotating around the oscillation axis O.

(First Inner Guide 6a, Second Inner Guide 6b)

The first inner guide 6a is located toward one end in the direction of the oscillation axis O of the oscillatory actuator 1 and located further toward an opposite end in the direction of the oscillation axis O (toward the center of the case 2) than the first support unit 5a. The second inner guide 6b is located toward the opposite end in the direction of the oscillation axis O of the oscillatory actuator 1 and located further toward the one end in the direction of the oscillation axis O (toward the center of the case 2) than the second support unit 5b. That is, as illustrated in FIG. 4, the first inner guide 6a and the second inner guide 6b are located further toward the center in the direction of the oscillation axis O than the first support unit 5a and the second support unit 5b in the case 2. The first inner guide 6a and the second inner guide 6b are, for example, formed from a resin such as ABS. However, the material of the first inner guide 6a and the second inner guide 6b are not limited to resins.

As illustrated in FIGS. 2B, 5A, and 5B, the first inner guide 6a includes an annular frame 60a along the inner surface of the case body 10 and steps 61a formed on the frame 60a at three locations at a 120° pitch around the oscillation axis O. The steps 61a are helically inclined inward in the radial direction of the case body 10 and toward the opposite end in the direction of the oscillation axis O. The helical shape of the steps 61a is along the outer periphery (base end) of the spiral shape of the arms 52a of the first damper 40a. The steps 61a and the arms 52 have a space therebetween. The space keeps the steps 61a from coming in contact with the respective arms 52 when the elastic deformation of the first damper 40a is within the predetermined range and allows the steps 61a to come in contact with the respective arms 52 when the deformation of the first damper 40a is beyond the predetermined range.

Specifically, each of the steps 61a includes a side wall 61aw forming a plane parallel to the inner surface of the case body 10 and a bottom 61ab extending inward in the radial direction from the side wall 61aw. In top view, inner edges of the bottoms 61ab form an inner circumferential circle (concentric circle) coaxial with the inner surface of the case body 10, and the side walls 61aw have an arc shape curved in a direction from the inner surface of the case body 10 to the inner circumferential circle. When deforming in a direction intersecting the oscillation axis O beyond the predetermined range, the first damper 40a comes in contact with any of the side walls 61aw, and thus the movement thereof in this intersecting direction is restricted. When deforming in the direction of the oscillation axis O beyond the predetermined range, the first damper 40a comes in contact with the bottoms 61ab, and thus the movement thereof in the direction of the oscillation axis O is restricted.

Each step 61a has a hole 62a for weight reduction. The frame 60a of the first inner guide 6a has, at three locations on the outer periphery thereof, cutouts 63a formed along the shape of the flanges 13a of the case body 10 to fit the shape of the flanges 13a.

The first inner guide 6a having the above-described configuration allows the mover 4 to move forward and backward in the direction of the oscillation axis O within the inner circumferential circle formed by the frame 60*a*. The inner edge of the inner circumferential circle formed by the frame 60*a* is located further inward than the first coil 21*a* and the second coil 21*b* in the radial direction.

The second inner guide 6*b* has the same shape as the first inner guide 6*a*. The second inner guide 6*b* has the same configuration as the first inner guide 6*a*. That is, the components of the second inner guide 6*b* correspond to the components of the first inner guide 6*a*, as indicated by bracketed reference characters in FIGS. 5A and 5B. Specifically, the second inner guide 6*b* includes an annular frame 60*b*, and steps 61*b* each having a side wall 61*bw* and a bottom 61*bb* on the frame 60*b*. Each of the steps 61*b* has a hole 62*b*. The frame 60*b* has cutouts 63*b*.

(Operation)

In the oscillatory actuator 1 having the above-described configuration, as illustrated in FIG. 4, the mover 4 supported by the first damper 40*a* and the second damper 40*b* is located in the center of the first coil 21*a* and the second coil 21*b* when the first coil 21*a* and the second coil 21*b* are not energized.

For oscillation of the mover 4, the first coil 21*a* and the second coil 21*b* are energized through the terminal 12 with alternating current in directions for alternately generating magnetic fields of opposite polarities. That is, the same polarity is generated in adjacent portions of the first coil 21*a* and the second coil 21*b*.

Figure 6:
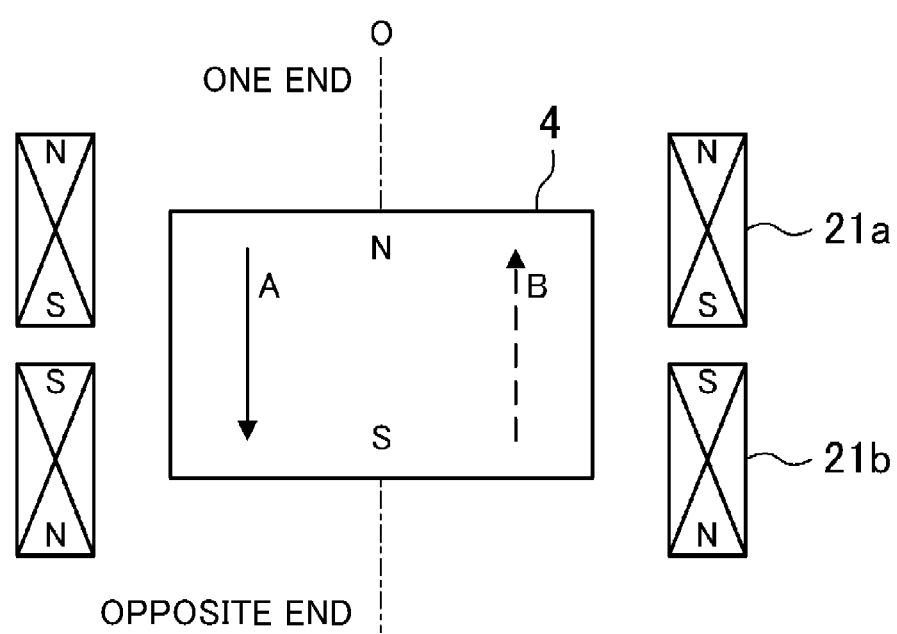
FIG. 6 is a diagram for explaining operation of the oscillatory actuator.

For example, in the case of the polarities shown in FIG. 6, thrust toward the opposite end in the direction of the oscillation axis O (downward in FIG. 6), which is represented by a solid arrow A, is generated in the mover 4. When the current flowing through the first coil 21*a* and the second coil 21*b* is reversed, thrust toward the one end in the oscillation axis O (upward in FIG. 6), which is represented by a dotted arrow B, is generated in the mover 4.

Thus, when the first coil 21*a* and the second coil 21*b* are energized with alternating current, the mover 4 oscillates along the oscillation axis O while receiving biasing forces exerted by the first damper 40*a* and the second damper 40*b* from both sides.

Note that the thrust generated in the mover 4 is basically in line with thrust given based on Fleming's left-hand rule. The first coil 21*a* and the second coil 21*b* in the present embodiment are fixed to the case 2. The thrust generated in the mover 4 including the magnet 30 is therefore reaction forces against forces generated in the first coil 21*a* and the second coil 21*b*.

That is, a horizontal component (component orthogonal to the axial direction of the magnet 30) of the magnetic flux of the magnet 30 of the mover 4 contributes to the thrust. The yoke 20 increases the horizontal component of the magnetic flux of the magnet 30.

As long as the oscillation of the mover 4 is normal, as described above, the first damper 40*a* and the second damper 40*b* elastically deform in the direction of the oscillation axis O and in the radial direction within the predetermined range, and do not come in contact with the first inner guide 6*a* or the second inner guide 6*b*.

On the other hand, in a case where the oscillatory actuator 1 is subjected to an external impact, such as when a device including the oscillatory actuator 1 is dropped, for example, the mover 4 can move with an excessive amplitude, and the first damper 40*a* and the second damper 40*b* can move beyond the predetermined range. However, this movement is restricted by the contact with the first inner guide 6*a* and the second inner guide 6*b*.

Figure 7A:
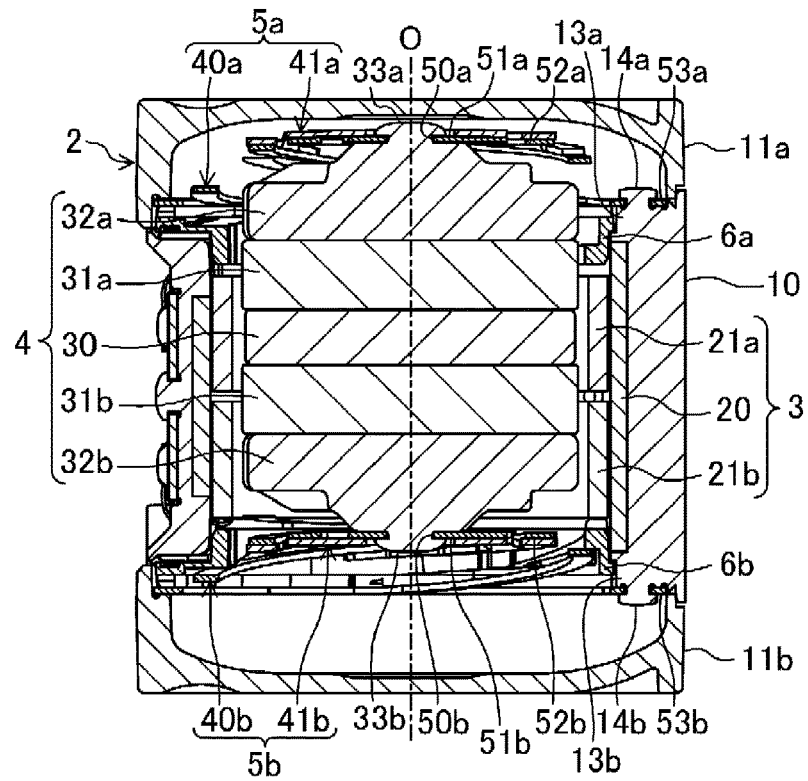
FIG. 7A is a cross-sectional view of a state in which movement of a mover toward one end in a direction of an oscillation axis is restricted.

Specifically, in a case where the mover 4 oscillates excessively toward the one end in the direction of the oscillation axis O, and the first damper 40*a* and the second damper 40*b* move beyond the predetermined range, the arms 53*b* of the second damper 40*b* come in contact with the bottoms 61*bb* of the steps 61*b* of the second inner guide 6*b* as illustrated in FIG. 7A. This restricts the mover 4 from moving further toward the one end in the direction of the oscillation axis O, keeping the mover 4 from coming in contact with the case 2 (first cover case 11*a*).

Figure 7B:
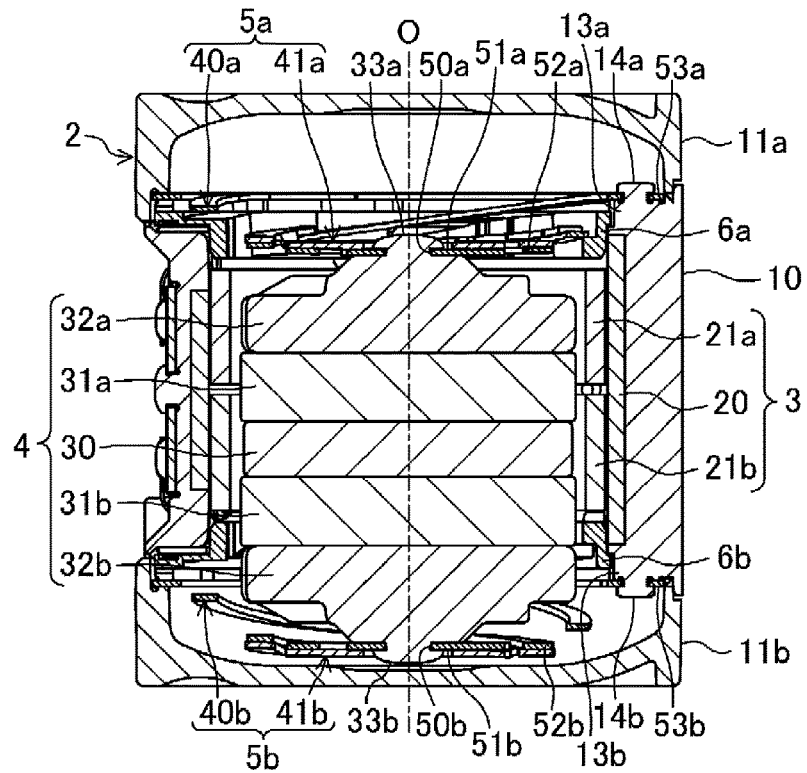
FIG. 7B is a cross-sectional view of a state in which movement of the mover toward an opposite end in the direction of the oscillation axis is restricted.

In a case where the mover 4 oscillates excessively toward the opposite end in the direction of the oscillation axis O, and the first damper 40*a* and the second damper 40*b* move beyond the predetermined range, the arms 52*a* of the first damper 40*a* come in contact with the bottoms 61*ab* of the steps 61*a* of the first inner guide 6*a* as illustrated in FIG. 7B. This restricts the mover 4 from moving further toward the opposite end in the direction of the oscillation axis O, keeping the mover 4 from coming in contact with the case 2 (second cover case 11*b*).

In a case where the case 2 is subjected to an impact in the radial direction, the mover 4 also moves in the radial direction, which is not illustrated. In such a case, upon the mover 4 moving in the radial direction, and the first damper 40*a* and the second damper 40*b* moving in the radial direction beyond the predetermined range, the arms 52*a* and 52*b* of the first damper 40*a* and the second damper 40*b* come in contact with the side walls 61*aw* and 61*bw* of the steps 61*a* and 61*b* of the first inner guide 6*a* and the second inner guide 6*b*. This restricts the mover 4 from moving further in the radial direction of the case 2, keeping the mover 4 from coming in contact with the case 2. Note that both of the first damper 40*a* and the second damper 40*b* do not necessarily have to come in contact with the first inner guide 6*a* and the second inner guide 6*b*, respectively. The same effect is achieved through one of them coming in contact with the corresponding inner guide.

As described above, the oscillatory actuator 1 according to the present embodiment can reduce excessive amplitude of oscillation of the mover 4 through the first inner guide 6*a* and the second inner guide 6*b* restricting the movement of the first damper 40*a* and the second damper 40*b*. Since the first damper 40*a* and the second damper 40*b* are formed of plate springs, the first damper 40*a* and the second damper 40*b* elastically deform to absorb a shock when the first inner guide 6*a* and the second inner guide 6*b* come in contact with the first damper 40*a* and the second damper 40*b*. Furthermore, the first inner guide 6*a* and the second inner guide 6*b* in the case 2 are located further inward than the first damper 40*a* and the second damper 40*b* in the direction of the oscillation axis O. This prevents or reduces an increase in the size of the case 2. It is therefore possible to reduce a shock on the mover 4 upon an external impact while also preventing or reducing an increase in the size of the oscillatory actuator 1.

In particular, the first inner guide 6*a* and the second inner guide 6*b* restrict the movement of the first damper 40*a* and the second damper 40*b* in the direction of the oscillation axis O. This makes it possible to reduce excessive amplitude of oscillation of the mover 4 in the direction of the oscillation axis O.

The first inner guide 6*a* and the second inner guide 6*b* also restrict the movement of the first damper 40*a* and the second damper 40*b* in the directions intersecting the oscillation axis O including the radial direction of the case 2. This makes it possible to restrict the movement of the mover 4 in the radial direction.

The first inner guide 6a and the second inner guide 6b include the steps 61a and 61b having a helical shape that is centered around the direction of the oscillation axis O and that corresponds to the spiral shape of the arms 52a and 52b of the first damper 40a and the second damper 40b. The first inner guide 6a and the second inner guide 6b can therefore restrict the movement of the first damper 40a and the second damper 40b in the direction of the oscillation axis O and in the directions intersecting the oscillation axis O in accordance with the shape of the first damper 40a and the second damper 40b. The steps 61a and 61b have the bottoms 61ab and 61bb that fit the shape of the arms 52a and 52b when the mover 4 is oscillating. It is therefore possible to disperse an impact using surface contact of the arms 52a and 52b with the bottoms 61ab and 61bb.

The first inner guide 6a is located between the electromagnetic driver 3 and the first damper (first plate spring) 40a in the direction of the oscillation axis O. The second inner guide 6b is located between the electromagnetic driver 3 and the second damper (second plate spring) 40b in the direction of the oscillation axis O. This makes it possible to keep the electromagnetic driver 3 from coming in contact with the first damper 40a and the second damper 40b.

Furthermore, the inner edges of the inner circumferential circles of the frames 60a and 60b are located further inward (toward the mover 4) than the first coil 21a and the second coil 21b in the radial direction. The first inner guide 6a and the second inner guide 6b can therefore keep the mover 4 from coming in contact with the first coil 21a and the second coil 21b more reliably.

The first damper 40a and the second damper 40b support the opposite ends of the mover 4, and the first inner guide 6a and the second inner guide 6b corresponding thereto respectively restrict the movement toward the one end and the movement toward the opposite end in the direction of the oscillation axis O. This makes it possible to reduce the space occupied by the inner guides, contributing to a size reduction.

Although an embodiment of the present invention has been described above, the present invention is not limited to the above-described embodiment and may take other embodiments.

For example, in the above-described embodiment, the first support unit 5a and the second support unit 5b supporting the mover 4 adopt the first damper 40a and the second damper 40b including the arms 52a and 52b having a spiral shape. However, other plate springs may alternatively be used as the support units. For example, plate springs may be adopted that have irregular spiral shapes including combinations of straight lines as well as curved lines, crisscross shapes, or swastika shapes. In this case, the inner guides also have a shape that fits the shape of the plate springs.

For another example, in the above-described embodiment, the first support unit 5a and the second support unit 5b have the first elastic member 41a and the second elastic member 41b. However, the first support unit 5a and the second support unit 5b do not necessarily have to have elastic members.

For another example, in the above-described embodiment, the case 2 has a hollow cylindrical shape, and the mover 4 has a substantially solid cylindrical shape. However, the shape of the case and the shape of the mover are not limited as such, and may be polygonal or other shapes.

DESCRIPTION OF REFERENCE CHARACTERS

1 Oscillatory Actuator
2 Case
3 Electromagnetic Driver
4 Mover
5a First Support Unit
5b Second Support Unit
6a First Inner Guide
6b Second Inner Guide
40a First Damper (Plate Spring, First Plate Spring)
40b Second damper (Plate Spring, Second Plate Spring)
61a, 61b Step

The invention claimed is:

1. An oscillatory actuator comprising:
a cylindrical case;
an electromagnetic driver provided inside the case;
a mover enabled to oscillate through driving by the electromagnetic driver;
a plate spring having a plurality of arms supporting the mover inside the case; and
an inner guide that is provided inside the case, has a part contactable with the plate spring after movement of the plate spring beyond a predetermined range, and is configured to restrict movement of the plate spring beyond the predetermined range, the inner guide being located further toward a center of the case than the plate spring in a direction of an oscillation axis of the mover;
wherein the part of the inner guide that is contactable with the plate spring is located between the electromagnetic driver and the plate spring in the direction of the oscillation axis of the mover.

2. The oscillatory actuator of claim 1, wherein
the inner guide restricts the movement of the plate spring beyond the predetermined range in the direction of the oscillation axis.

3. The oscillatory actuator of claim 1, wherein
the inner guide restricts the movement of the plate spring in directions intersecting the direction of the oscillation axis.

4. The oscillatory actuator of claim 1, wherein
the arms of the plate spring form a spiral shape, and
the inner guide includes steps having a helical shape that is centered around the direction of the oscillation axis and that corresponds to the spiral shape of the plate spring.

5. The oscillatory actuator of claim 1, wherein
an inner edge of the inner guide is located further toward the mover than an inner surface of the electromagnetic driver.

6. The oscillatory actuator of claim 1, wherein
the plate spring includes a first plate spring supporting one end of the mover and a second plate spring supporting an opposite end of the mover, and
the inner guide includes a first inner guide configured to restrict movement of the first plate spring and a second inner guide configured to restrict movement of the second plate spring.

* * * * *